United States Patent
Tsai et al.

(10) Patent No.: US 6,948,658 B2
(45) Date of Patent: Sep. 27, 2005

(54) METHOD FOR AUTOMATICALLY INTEGRATING DIGITAL DATA

(75) Inventors: Jewel Tsai, Hsinchu (TW); Larry Chang, Taipei (TW)

(73) Assignee: Mustek Systems Inc. (TW)

( * ) Notice: Subject to any disclaimer, the term of this patent is extended or adjusted under 35 U.S.C. 154(b) by 57 days.

(21) Appl. No.: 10/053,677

(22) Filed: Jan. 24, 2002

(65) Prior Publication Data

US 2002/0185534 A1 Dec. 12, 2002

(30) Foreign Application Priority Data

Jun. 7, 2001 (TW) .................................. 90113759 A

(51) Int. Cl.⁷ .................................................. G06K 7/10
(52) U.S. Cl. ........................................ 235/454; 454/440
(58) Field of Search .............................. 235/440, 454, 235/470, 379, 375, 436; 358/1.17, 448, 488

(56) References Cited

U.S. PATENT DOCUMENTS

| | | | | |
|---|---|---|---|---|
| 4,855,580 A | * | 8/1989 | Van Maanen, Jr. | 235/440 |
| 5,103,490 A | * | 4/1992 | McMillin | 382/284 |
| 5,452,379 A | * | 9/1995 | Poor | 382/317 |
| 5,461,488 A | * | 10/1995 | Witek | 358/402 |
| 5,613,016 A | * | 3/1997 | Saitoh | 382/174 |
| 5,659,164 A | * | 8/1997 | Schmid et al. | 235/375 |
| 5,729,741 A | * | 3/1998 | Liaguno et al. | 707/104.1 |
| 5,748,755 A | * | 5/1998 | Johnson et al. | 382/115 |
| 5,845,302 A | * | 12/1998 | Cyman et al. | 715/517 |
| 5,896,462 A | * | 4/1999 | Stern | 382/306 |
| 5,920,685 A | * | 7/1999 | Romano et al. | 358/1.15 |
| 6,078,403 A | * | 6/2000 | Palmer | 358/1.18 |
| 6,078,907 A | * | 6/2000 | Lamm | 705/40 |
| 6,108,672 A | * | 8/2000 | DeJoseph | 707/505 |
| 6,275,609 B1 | * | 8/2001 | Kugai | 382/175 |
| 6,360,951 B1 | * | 3/2002 | Swinehart | 235/472.01 |
| 6,633,332 B1 | * | 10/2003 | Nay et al. | 348/220.1 |
| 6,812,995 B2 | * | 11/2004 | Honma | 355/18 |

* cited by examiner

Primary Examiner—Ahshik Kim
(74) Attorney, Agent, or Firm—Lowe Hauptman & Berner, LLP

(57) ABSTRACT

A method for automatically integrating digital data obtained from the interaction between an image pickup apparatus and a data-processing apparatus is provided. The method includes steps of opening a file; picking up the image of a first object to provide first image data; converting the first image data into first digital data; automatically saving the first digital data into the file; picking up the image of a second object to provide second image data; converting the second image data into second digital data; and automatically saving the second digital data into the file including the first digital data. It is especially convenient for users to manage documents more than one page.

4 Claims, 3 Drawing Sheets

METHOD FOR AUTOMATICALLY INTEGRATING DIGITAL DATA

FIELD OF THE INVENTION

The present invention relates to a method for automatically integrating digital data, and more particularly to a method for automatically integrating digital data obtained from the interaction between an image pickup apparatus and a data-processing apparatus.

BACKGROUND OF THE INVENTION

Because of the rapid development of the information communication industry, to digitalize images is a well known and an important technology. Digital image pickup apparatuses such as digital scanners, digital cameras, and digital video cameras are used worldwide in lots of fields. Among the advantages of digitalizing images is that digital data-processing apparatuses such as personal computers (PC) and personal digital assistants (PDA) can process these digitalized data obtained by the digital image pickup apparatuses. Then the processed data will be saved or recognized for some applications.

For example, the digitalizing process usually comprises the following steps. At first, the scanner scans a page of words to provide a digital image file, and then scans another page of words to provide another digital image file. The personal computer will execute an optical character recognition (OCR) program to convert these digital image files into respective text files.

The usual procedure to scan and recognize documents includes steps of:

(a) lifting the cover of a flatbed scanner and putting the first document on the scanning window;

(b) closing the cover and scanning the first document;

(c) saving the first image data as a first image file in the personal computer operated with the scanner;

(d) executing an optical character recognition program to convert the first image file into a first text file;

(e) lifting the cover of the flatbed scanner again, withdrawing the first document, and putting the second document on the scanning window;

(f) closing the cover and scanning the second document;

(g) saving the second image data as a second image file in the personal computer operated with the scanner; and (h) converting the second image file into a second text file by the optical character recognition program.

Now we have two text files. Hence, after the prior scanning procedure completes, the obtained text files are the same in number as the scanned pages. The users must perform an additional step to combine these text files into an integrated text file if the contents of these pages compose an article. It really wastes time. Even if an auto-feeding scanner is applied to the case, the steps including scanning, recognizing, and integrating still cannot be executed automatically. Only the steps of lifting cover, replacing pages, and closing cover can be omitted. Therefore, a more efficient method for integrating the scanned data is desired.

SUMMARY OF THE INVENTION

An objective of the present invention is to disclose a method for automatically integrating digital data obtained from the interaction between an image-pickup apparatus and a data-processing apparatus.

In accordance with the present invention, the method includes steps of: opening a file by the data-processing apparatus such as personal computer; picking up the image of a first object by the image pickup apparatus such as scanner to provide first image data; processing the first image data to provide first digital data; automatically saving the first digital data into the file by the data-processing apparatus; capturing the image of a second object by the image pickup apparatus to provide second image data; processing the second image data to provide second digital data; and automatically saving the second digital data into the file including the first digital data.

In accordance with another aspect of the present invention, the first object and second object are documents to be scanned. Certainly, the processing steps are preferably optical character recognition steps to convert the image data into digital data and the file including the digital data is a text file.

In accordance with another aspect of the present invention, the image pickup apparatus is preferably an auto-feeding scanner.

In accordance with another aspect of the present invention, the method further includes a step of automatically executing an application program on the personal computer to process the text file including the combined digital data. Certainly, the application program can be a text editor or an e-mail editor.

In accordance with the present invention, the method includes steps of: opening a file on the data-processing apparatus such as personal computer; capturing the image of a first object by the image pickup apparatus such as scanner to provide first image data; automatically saving the first image data into the file on the data-processing apparatus; picking up the image of a second object by the image pickup apparatus to provide second image data; and automatically saving the second image data into the file including the first image data.

In accordance with another aspect of the present invention, the method further includes a step of processing the file including the first image data and the second image data. Preferably, the processing step is an optical character recognition step to convert the file including the first image data and the second image data into a text file when the first object and second object are documents to be scanned.

In accordance with another aspect of the present invention, the method further includes a step of automatically executing an application program on the data-processing apparatus to process the file. The application program is preferably a text editor or an e-mail editor if the first object and second object are documents to be scanned. On the other hand, the application program is preferably an image editor or an e-mail editor if the first object and second object are pictures to be scanned.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention discloses a method for automatically integrating digital data adapted to be used between an image pickup apparatus and a data-processing apparatus. The image pickup apparatus can be a digital scanner, a digital camera, or a digital video camera; and the data-processing apparatus can be a personal computer or a personal digital assistant.

Figure 1:
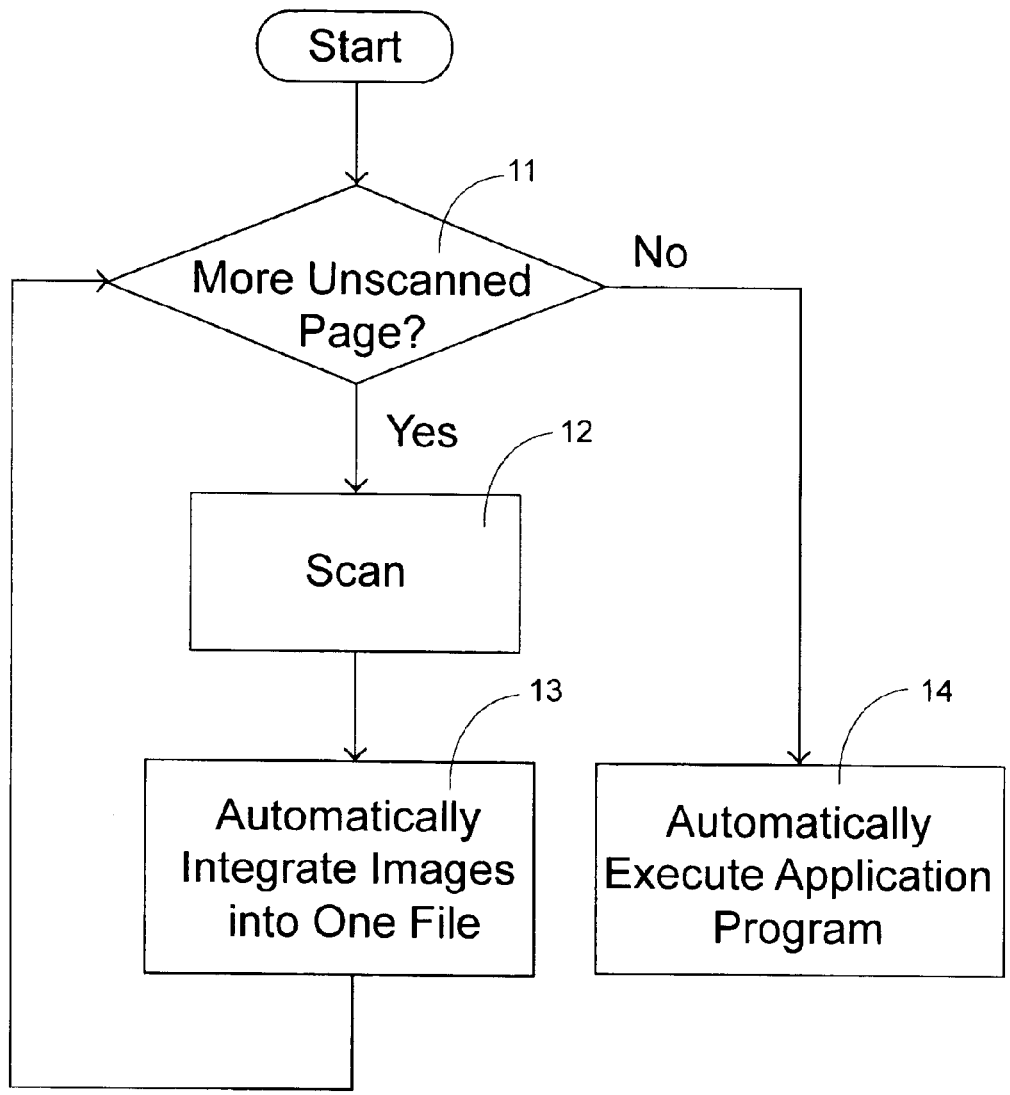
FIG. 1 is a flow chart showing a preferred embodiment of the steps to automatically integrate digital data according to the present invention.

Please refer to FIG. 1 which is a flow chart showing a preferred embodiment of steps to automatically integrate digital data according to the present invention. The description is based on employing an auto-feeding scanner as the image pickup apparatus and a personal computer as the data-processing apparatus. At first, the auto-feeding scanner scans the provided pages in sequence. At steps 11, 12, and 13, until all the pages are scanned, the auto-feeding scanner repeats loading pages, scanning these pages to provide images, and saving these images in a single specific file opened by the personal computer. Finally at step 14, the personal computer automatically executes an application program to process the specific file. For example, the application program can be an image editor to process the digital image file. The processing method may include any known imaging technology, e.g. warping images, lighting effects, adding text, etc. Certainly, the application program can be an e-mail editor. Thus, this digital image file will be attached to an edited e-mail and sent with the e-mail later.

Figure 2:
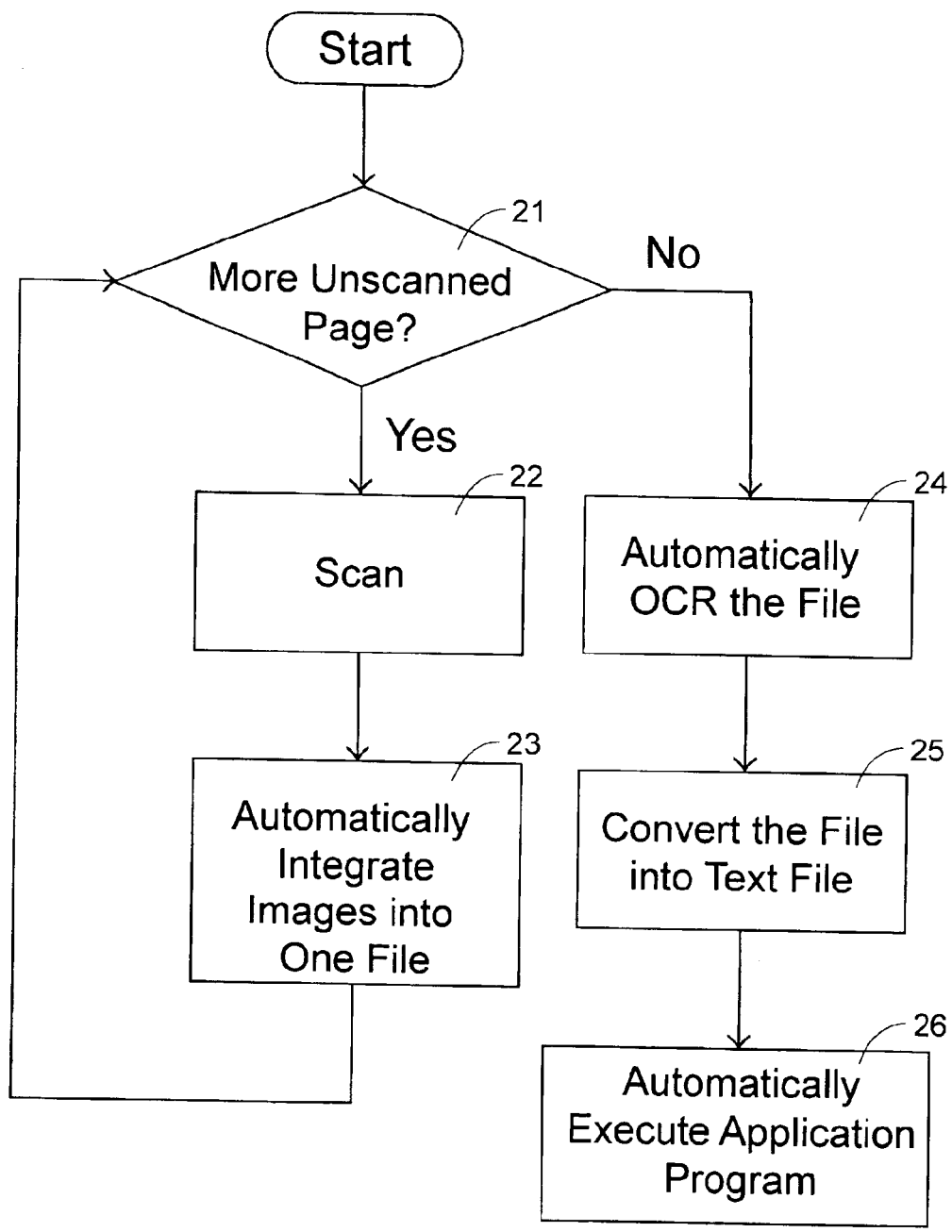
FIG. 2 is a flow chart showing another preferred embodiment of the steps to automatically integrate digital data according to the present invention.

Please refer to FIG. 2 which is a flow chart showing another preferred embodiment of steps to automatically integrate digital data according to the present invention. Similarly, this preferred embodiment is also based on employing an auto-feeding scanner as the image pickup apparatus and a personal computer as the data-processing apparatus. At first, the auto-feeding scanner scans the provided pages in sequence. At steps 21, 22, and 23, until all the pages are scanned, the auto-feeding scanner repeats loading pages, scanning these pages to provide images, and saving these images in one specific file opened by the personal computer. Then at step 24, the personal computer automatically executes an optical character recognition program with collated function to convert the specific image file into a collated text file as at step 25. Finally at step 26, the personal computer automatically executes an application program to process the text file. The application program can be a text editor for users to edit the contents of the collated text file. Certainly, the application program can be an e-mail editor. Thus this collated text file will be attached to an edited e-mail and sent with the e-mail later.

Figure 3:
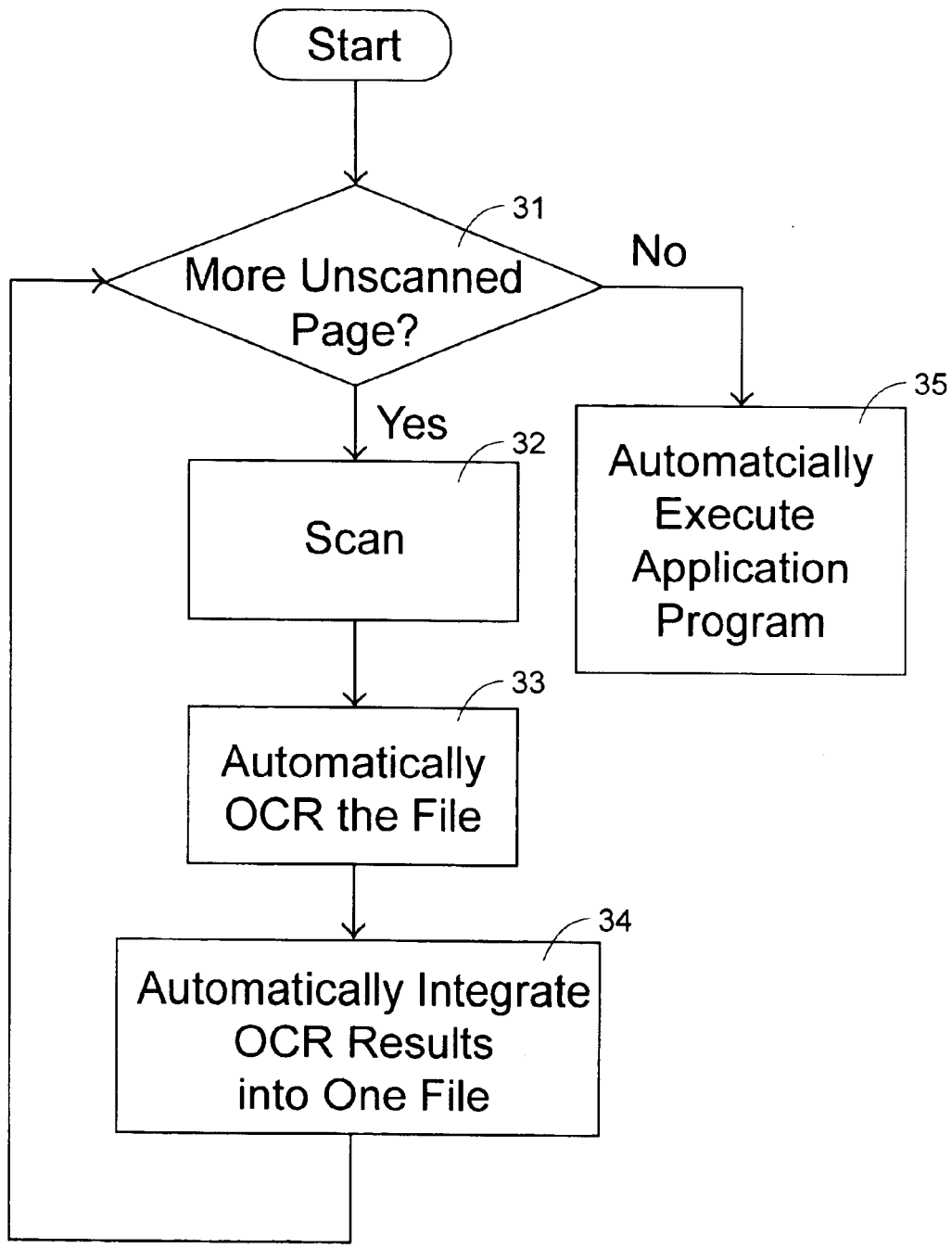
FIG. 3 is a flow chart showing a further preferred embodiment of the steps to automatically integrate digital data according to the present invention.

Please refer to FIG. 3 which is a flow chart showing another preferred embodiment of steps to automatically integrate digital data according to the present invention. Similarly, this preferred embodiment is also based on employing an auto-feeding scanner as the image pickup apparatus and a personal computer as the data-processing apparatus. At first, the auto-feeding scanner scans the provided pages in sequence. At step 31, the sheet feeder of the auto-feeding scanner determines whether all the pages are scanned. If no unscanned page is found, then the procedure proceeds to step 35. If there still exists unscanned page, then the sheet feeder continues to load the unscanned page into the scanner to have the page scan to provide image signals as at step 32. At step 33, the personal computer automatically executes an optical character recognition program to process these image signals. At step 34, the results of the optical character recognition are saved in one specific file (e.g. *.doc, *.txt, or *.xls) by the personal computer. This file may be a newly opened file of an existing file. After all the pages are scanned, recognized, and integrated into the specific file, the procedure proceeds to step 35. The personal computer automatically executes an application program such as a text editor or an e-mail editor to process the specific file as described in the foregoing paragraphs.

Of course the preferred embodiments recited in the specification are used to describe the characteristics of the present invention only, but the present invention is not limited to the recited preferred embodiments. For example, the pages to be scanned may include both figures and words. The scanned results will be automatically integrated into one image file. Then the personal computer processes the text parts of the image file by an optical character recognition program so that the text parts are converted into words. Following the recognition step, the personal computer automatically executes an editor program which can edit both figures and words. Hence, the resulting file including words and figures are more easily. The present invention can prevent the disadvantage of forming too much image files and provide users with a convenient and time-saving method for automatically integrating digital data the users have no need for doing additional jobs to combine the image files together.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for automatically integrating digital data obtained from the interaction between an image pickup apparatus and a data-processing apparatus, comprising the steps of:

opening a text file by said data-processing apparatus;

picking up the image of a first object by said image pickup apparatus to provide first image data;

processing said first image data to provide first digital data, and saving automatically said first data into said text file performed by an optical characteristic recognition;

picking up the image of a second object by said image pick up apparatus to provide second image data;

processing said second image data to provide second digital data, and saving automatically said second digital data into said text file including said first digital data performed by said optical characteristic recognition; and executing automatically an email editing application program by said data-processing apparatus to process said file, wherein said text file containing said first digital data and said second digital data, with texts and photos, are stored by a text editing program.

2. The method according to claim 1 wherein said image pickup apparatus is a scanner.

3. The method according to claim 1 wherein said first object and said second object are documents to be scanned.

4. The method according to claim 3 wherein said image pickup apparatus is an auto-feeding scanner.

* * * * *